(12) United States Patent
Konno

(10) Patent No.: US 6,198,276 B1
(45) Date of Patent: Mar. 6, 2001

(54) FERROMAGNETIC-BALL SENSOR USING A MAGNETIC FIELD DETECTION ELEMENT

(75) Inventor: Hideto Konno, Toyko (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/026,258

(22) Filed: Feb. 19, 1998

(30) Foreign Application Priority Data

Feb. 19, 1997 (JP) .................................................... 9-049615

(51) Int. Cl.⁷ ........................................................ G01B 7/14
(52) U.S. Cl. ............................... 324/207.22; 324/207.26; 324/207.21
(58) Field of Search .................. 324/207.21, 207.26; 338/32 R; 273/121 A, 121 B, 118 A

(56) References Cited

U.S. PATENT DOCUMENTS 5,477,143 * 12/1995 Wu .................................. 324/207.21

FOREIGN PATENT DOCUMENTS

| | | |
|---|---|---|
| 60-102585 | 6/1985 | (JP) . |
| 61-199875 | 9/1986 | (JP) . |
| 62-113085 | 5/1987 | (JP) . |
| 63-27884 | 2/1988 | (JP) . |
| 2-189484 | 7/1990 | (JP) . |
| 6-292753 | 10/1994 | (JP) . |
| 7-31082 | 6/1995 | (JP) . |
| 7-78528 | 8/1995 | (JP) . |
| 10-188751 | 7/1998 | (JP) . |

\* cited by examiner

*Primary Examiner*—Walter E. Snow
(74) *Attorney, Agent, or Firm*—Scully, Scott, Murphy & Presser

(57) ABSTRACT

The present invention relates to a ferromagnetic-article sensor comprises a pathway-forming means for defining a pathway for a ferromagnetic-article; a magnet disposed adjacent to the pathway, forming a magnetic field; and a magnetic field detection element for detecting a part of a magnetic field formed by the magnet, the part of the magnetic field extending parallel to the plane of the magnetic field detection element; wherein the pathway-forming means, the magnet, and the magnetic field detection element are arranged such that the magnetic field detection element detects modification of magnetic fields by the ferromagnetic-article when the ferromagnetic-article travels through the pathway, distorting the magnetic field.

8 Claims, 6 Drawing Sheets

FERROMAGNETIC-BALL SENSOR USING A MAGNETIC FIELD DETECTION ELEMENT

BACKGROUND OF THE INVENTION

1. Field of the Invention

The invention relates to a ferromagnetic-article sensor and, more particularly, to a ferromagnetic-article sensor using a magnetic field detection element resistive to a part of a magnetic field parallel to a magneto-resistive face.

This application is based on Japanese Patent Application No. Hei 9-049615, the contents of which are incorporated herein by reference.

2. Background Art

Japanese Patent Applications, First Publications, No. Sho 60-102585 and No. Sho 61-199875 disclose a metal ball detecting apparatus.

FIG. 7 shows the metal ball detecting apparatus of the prior art. The metal ball detecting apparatus is comprised of a holder 30 having a through-hole 40 for a metal ball 50; a permanent magnet 10 and a Hall element 60 mounted on the holder 30; and an L-shaped magnetic path 70 of ferromagnetic material connected to the permanent magnet 10 and to the Hall element 60.

The pole face of the permanent magnet 10 and the magneto-resistive face of the Hall element 60 are disposed perpendicularly to a radius of the metal ball 50 traveling through the through-hole 40.

There are restrictions on the arrangements of the permanent magnet 10, the Hall element 60, and the metal ball 50 because the metal ball detecting apparatus employs a magnetic field detection element, such as the Hall element, which is responsive to a magnetic field perpendicular to the element face. Namely, an angle between the permanent magnet face and the Hall element face must be 90 degrees, or 90×N degrees (N is a natural number). The magneto-resistive face of the Hall element 60 must be disposed perpendicular to a radius of the metal ball 50, in other words, parallel to a line tangential to the metal ball 50.

In addition, due to an output characteristic of the Hall element 60, which is inferior in linearity in response to a low magnetic field of less than 30 gauss, the magnetic field formed by the permanent magnet 10 must be enhanced, or a gap between the permanent magnet 10 and the Hall element 60 must be very narrow. This creates a problem in that the metal ball 50 may be attracted to the permanent magnet 10.

SUMMARY OF THE INVENTION

It is an object of the present invention to provide a ferromagnetic-article sensor which allows latitude in arranging a magnet and a detection element and which can employ a small magnet with a low magnetic field strength, thereby reducing cost and size of the sensor.

In order to accomplish the above object, a ferromagnetic-article sensor comprises a pathway-forming means for defining a pathway for a ferromagnetic-article; a magnet disposed adjacent to the pathway, forming a magnetic field; and a magnetic field detection element for detecting a part of a magnetic field formed by the magnet, the part of the magnetic field extending parallel to the plane of the magnetic field detection element; wherein the pathway-forming means, the magnet, and the magnetic field detection element are arranged such that the magnetic field detection element detects modification of magnetic fields by the ferromagnetic-article when the ferromagnetic-article travels through the pathway, distorting the magnetic field.

The ferromagnetic-article sensor according to the present invention allows latitude in determining a position of the magnetic field detection element relative to the traveling ferromagnetic-article, allowing a greater freedom of design, because the magnetic field detection element responsive to the magnetic field parallel to the magneto-resistive face is employed.

Further, the ferromagnetic-article sensor of the present invention allows latitude in arranging the permanent magnet, the through-hole and the magnetic field detection element, because the parallel magnetic field detection element is sensitive to a low magnetic field and responsive to a part of the magnetic field in a specified direction formed by the permanent magnet and the ferromagnetic-article.

In second aspect of the present invention, an angle between a first plane passing through the centers of the ferromagnetic-article and of the magnetic field detection element and a second plane passing through the magneto-resistive face of the magnetic field detection element, is in a range of one of 42–80 degrees, 132–170 degrees, 222–260 degrees, and 312–350 degrees. An angle between the center of the magnet and the center of the magnetic field detection element with respect to the center of the ferromagnetic-article may be in a range of one of 42–80 degrees, 132–170 degrees, 222–260 degrees, and 312–350 degrees. Preferably, the magnet has a magnetic intensity of 1000–2000 gauss as a surface flux magnetic density.

According to the present invention, the ferromagnetic-article sensor allows latitude in determining a position of the magnetic field detection element because the magnetic field detection element which is responsive to a magnetic field parallel to the element face is employed and is sensitive to a low magnetic field.

Preferably, pluralities of the magnet and the magnetic field detection element are provided so as to detect a rate of travel of the ferromagnetic-article traveling through the pathway. The magnetic field detection element may be formed of a thin film of one of Ni—Fe, Ni—Co, and Ni—Fe—Co, and may be arranged on a silicon substrate of an integrated circuit chip.

The magnetic field detection element may be one of an anisotropic magneto-resistive element, a giant magneto-resistive element, or a colossal magneto-resistive element. In addition, the magnet may be a permanent magnet.

DETAILED DESCRIPTION OF THE PREFERRED EMBODIMENTS

The best mode of a ferromagnetic-article sensor according to the embodiment of the present invention will be explained with reference to FIGS. 1 to 6.

Figure 1A:
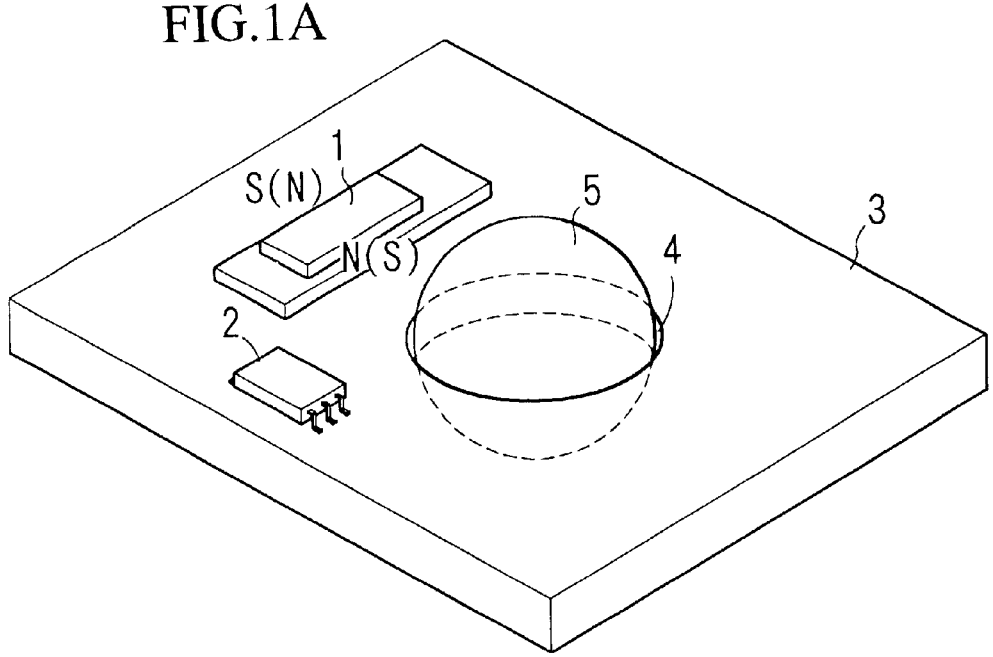
FIG. 1A is a perspective view showing a ferromagnetic-article sensor according to the embodiment of the present invention.

As shown in FIG. 1A, the ferromagnetic-article sensor is comprised of a base, which constitutes pathway forming means, such as a holder 3 having a through-hole (pathway) 4 through which a ball 5 travels; a permanent magnet 1 preferably having a magnetic intensity of 1000–2000 gauss as a surface magnetic flux density, mounted on the holder 3; and a magnetic field detection element 2 having a magneto-resistive face responsive to a magnetic field parallel to the face, such as an AMR element (anisotropic magneto-resistive element) having an anisotropy magneto-resistive effect. A pulse shaping circuit may be connected to the AMR element. The permanent magnet 1 preferably forms a magnetic field of 20–30 gauss in a specified direction at a distance of several millimeters from the permanent magnet 1.

Figure 1B:
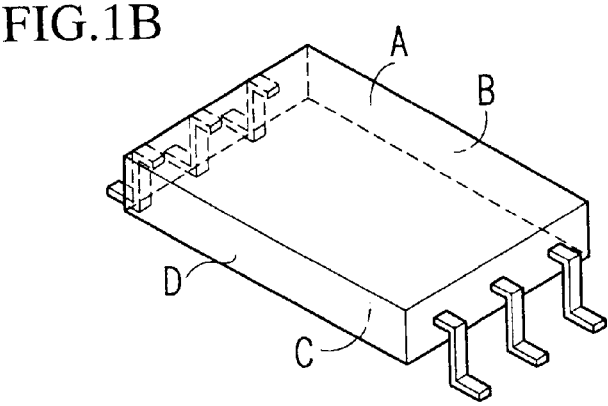
FIG. 1B is an enlarged perspective view showing the magnetic field detection element.
Figure 1C:
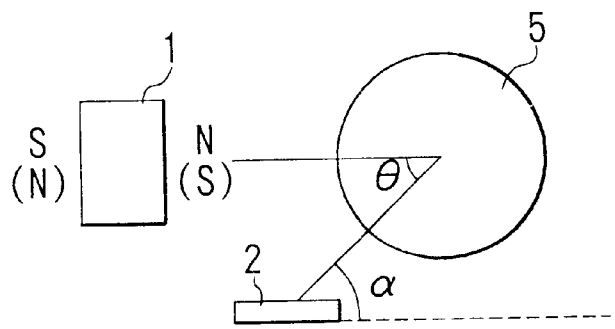
FIG. 1C is a plan view showing positions of a permanent magnet, the magnetic field detection element, and a ferromagnetic-article of the embodiment.

As shown in FIG. 1B, the magneto-resistive face may be formed on one of an upper face A, a rear face B, a underside face C and a front face D. As shown in FIG. 1C, it is unnecessary to dispose the magneto-resistive face perpendicularly to a radius of the ball 5 because the magnetic field detection element 2 detects a magnetic field parallel to the magneto-resistive face.

Figure 2:
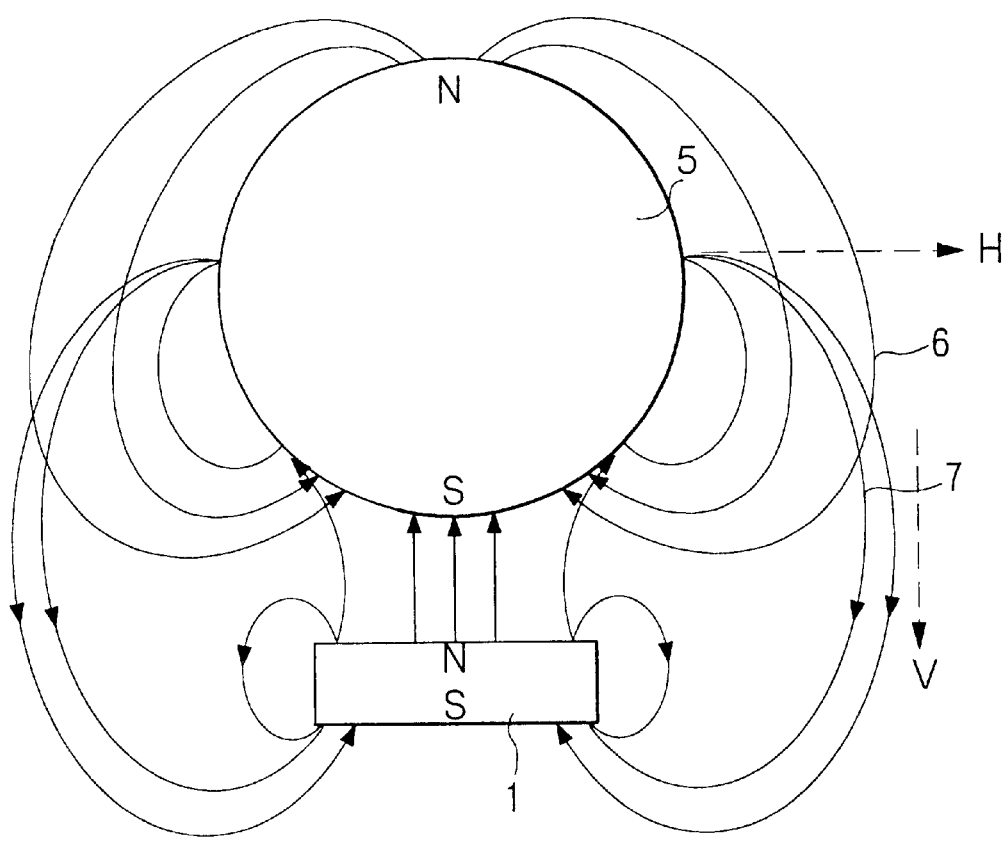
FIG. 2 is a view showing distribution of a magnetic field formed by the permanent magnet and the ferromagnetic-article of the embodiment.

FIG. 2 shows a magnetic field formed by the permanent magnet 1 when the ball 5 travels through the through-hole 4. N and S poles are formed in the ferromagnetic-ball 5 in communication with the permanent magnet 1. The magnetic field includes a magnetic force line 6 directed from the N pole of the ferromagnetic-ball 5 on the opposite side of the permanent magnet 1 toward the S pole of the ferromagnetic-ball 5 adjacent to the permanent magnet 1; and a magnetic force line 7 directed from the middle of the ferromagnetic-ball 5 in a direction H toward the S pole of the permanent magnet 1 on the opposite side of the ferromagnetic-ball 5. In this situation, the magnetic field detection element 2 responds to the magnetic force lines 10 6 and 7 distorted in a direction V.

The ferromagnetic-article sensor detects the magnetic field strength between the N-pole (or S-pole) of the permanent magnet 1 and the ferromagnetic-ball 5, using the magnetic field detection element 2 having the magneto-resistive face responsive to a magnetic field parallel to the face. It is therefore unnecessary to direct the magneto-resistive face perpendicularly to the radius of the ball 5. The ferromagnetic-article sensor detects the traveling ferromagnetic-ball 5, because the magneto-resistive face is disposed so as to detect modification of the magnetic field in the direction V.

Figure 3A:
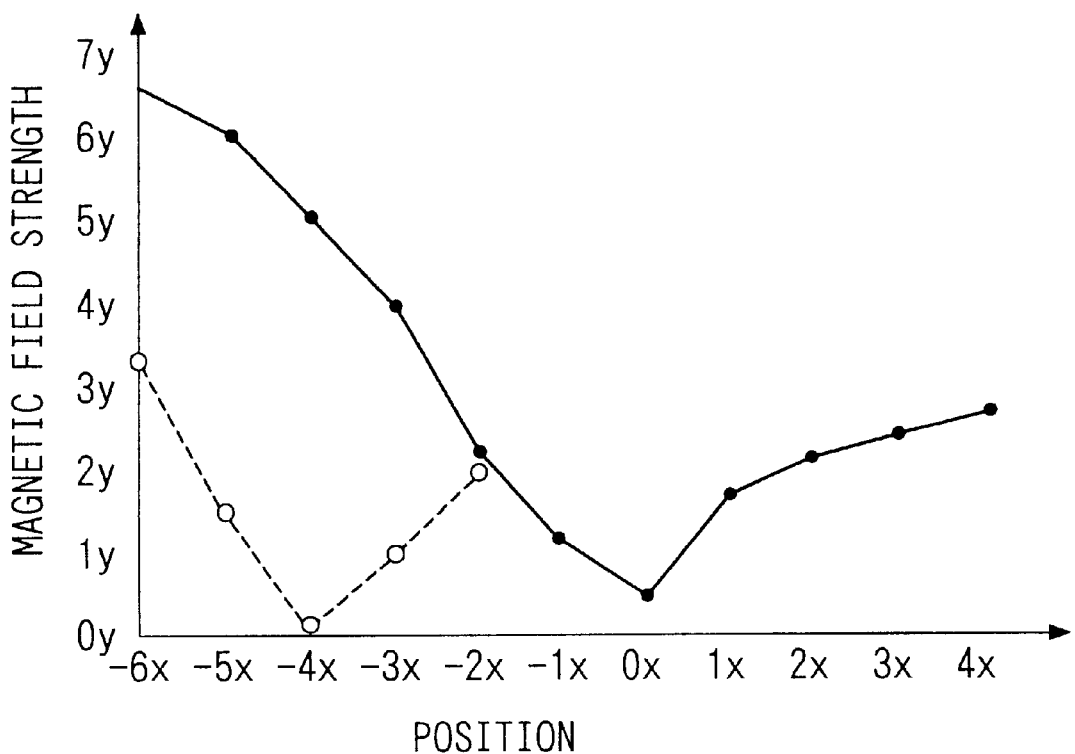
FIG. 3A is a graph showing fluctuations of the magnetic field strength detected by the magnetic field detection element, respectively, in the presence of, and in the absence of the ferromagnetic-article of the embodiment.
Figure 3B:
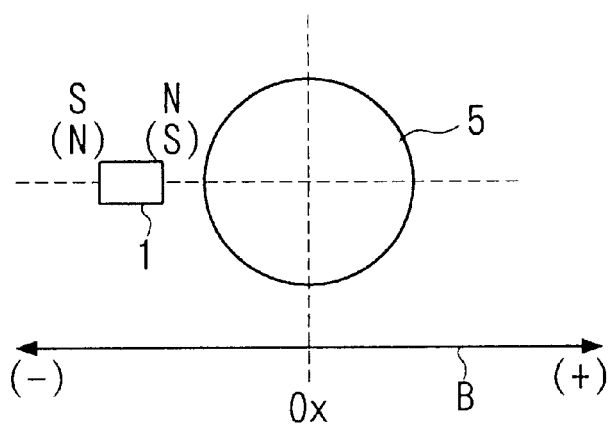
FIG. 3B is a plan view showing the position of the magnetic field detection element relative to the ferromagnetic-article of the embodiment.

Next, an operation of the embodiment will be explained with reference to FIGS. 3 and 4. FIG. 3A shows the magnetic field strength, respectively, in the presence of, and in the absence of the ferromagnetic-article of the embodiment, and FIG. 3B shows the positions of the permanent magnet 1 and the ball 5.

In FIG. 3, the horizontal axis represents a distance from the center 0x of the ball 5 in the direction B, and the vertical axis represents the magnetic field strength. The solid line shows the magnetic field strength at a time when the ball 5 travels through the through-hole 4, and the dotted line shows the magnetic field strength before and after the travel of the ball 5. In a range of −6x (the position of the left end of the ball 5) to 0x (the position of the center of the ball 5), the magnetic field strength shown by the solid line shows the maximum value at −6x and the minimum value at 0x. In a range of less than 0x (the left side of 0x), the magnetic field strength before and after the travel of the ball 5 (shown with the dotted line) becomes much lower than that at a time of travel of the ball 5 (shown by the solid line).

In a range of 0x to +4x, the magnetic field strength is increased to +4x (toward the position of the right end of the ball 5). When the magnetic field strength by the permanent magnet 1 is sufficiently great, the characteristic in the range of 0x to +4x is similar to that in the range of −6x to 0x.

The magnetic field detection element may be comprised of two elements or four elements, and if necessary, may be a composite device which includes those elements and an integrated circuit.

The magnetic field detection element alters its electrical resistance in response to the magnetic field parallel to the magneto-resistive face. The resistance value R per one element is changed in response to a signal magnetic field Hx, and is given by the formula:

$$R = Ro + \Delta Rmax\{1 - (Hx/Ho)^2\}$$

where Ro is an initial resistance value, ΔRmax is a maximum variable quantity, and Ho is a saturation magnetic field in a direction of a hard axis of the element, which Ho is given by Ho=4πMt/W+HK (W is the width of an element pattern, t is the thickness of the film, M is the saturation magnetization, Hk is an anisotropic magnetic field).

The positions of the permanent magnet 1 and the ball 5 is determined so that the resistance is effectively changed in response to change of the magnetic field strength in the direction V shown in FIG. 2. That is, the output from the magnetic field detection element is also increased in response to the increase of the magnetic field strength in the direction B, while the output is decreased in response to the decrease of the magnetic field strength in the direction B.

Preferably, an integrated magneto-resistive element is used as disclosed in Japanese Patent Application, Second Publication, No. Hei 7-078528, having a switching characteristic in response to a magnetic field strength.

Figure 4A:
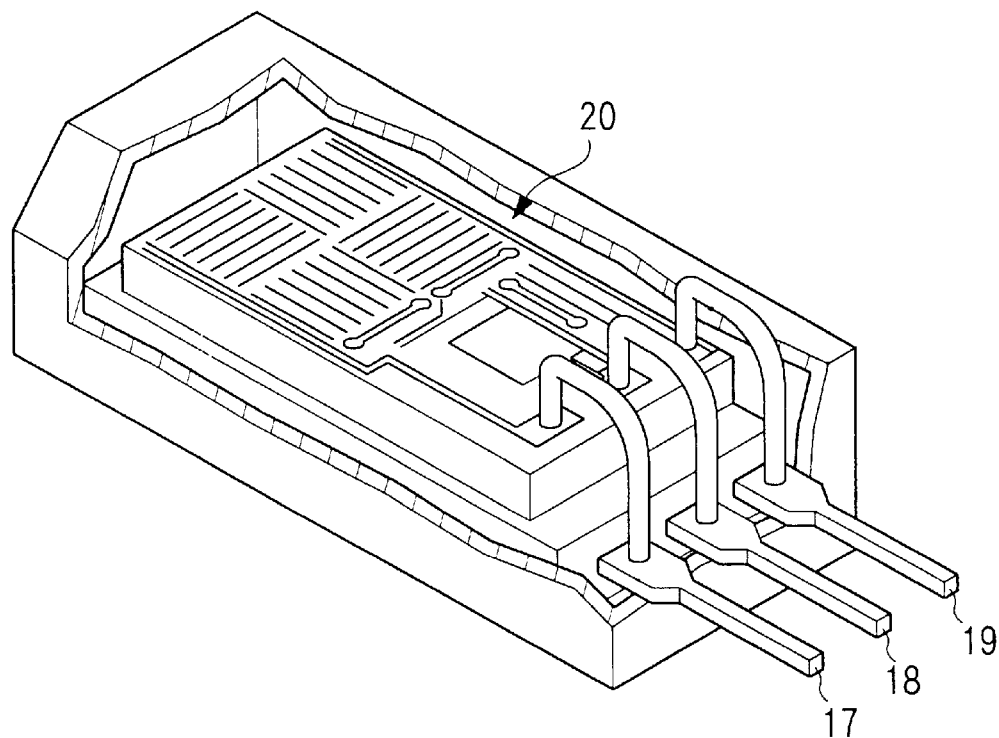
FIG. 4A is a perspective partially cutaway view showing a molded integrated magnetic field detection element formed on a substrate of an IC chip of the embodiment.
Figure 4B:
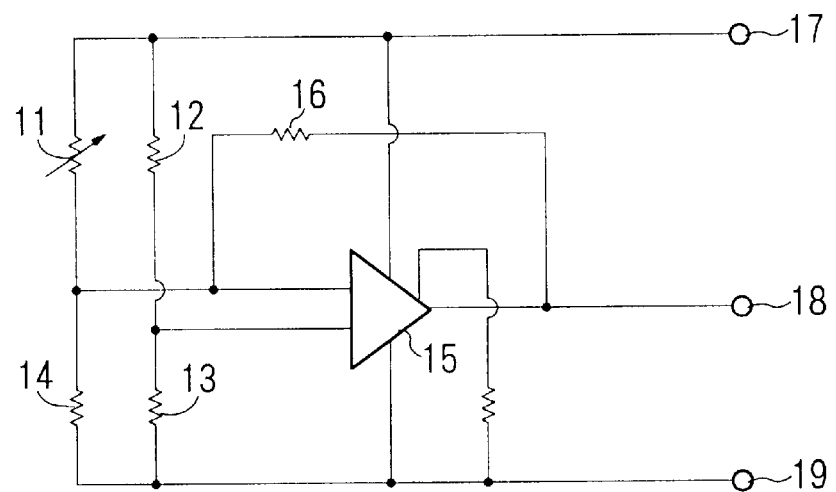
FIG. 4B is a circuit diagram of an equivalent circuit of the integrated magnetic field detection element of the embodiment.

FIG. 4A shows a construction of the molded integrated magneto-resistive element, and FIG. 4B shows an equivalent circuit of the element. The magneto-resistive element is formed by patterning a film of magneto-resistive material in a zigzag-shape on a predetermined plane (element face). The magneto resistor is divided into four portions and is incorporated in a bridge (circuit). The film of the magneto-resistive material is formed on the substrate of the integrated circuit chip of the wave-form shaping circuit. The divided portions are electrically connected to each other.

In the equivalent circuit, the bridge circuit which includes the magneto resistors 11 to 13 are connected to power supply terminals 17 and 19, and the output of a middle point of the bridge circuit is connected to a comparator having a feedback resistor 16 which gives a hysteresis characteristic, so that a pulse voltage is outputted from a terminal 18. This circuit works as a magneto-resistive switch, which increases the output voltage from "0" (high) to "1" (low) in response to the travel of the ferromagnetic-article.

A concrete example of the embodiment will be explained hereinbelow. With reference to FIG. 3, when the radius of the ball 5 is R, the values on the horizontal and vertical axes are set to meet the conditions of 5.5x=R and 6y=30 gauss. In the range of −6x to −2x, the magnetic field strength in the direction B (in FIG. 3B) in communication with the ferromagnetic-ball 5 traveling near the permanent magnet 1, is much greater than that in the absence of the ferromagnetic-ball 5. In the range −6x to −2x, an angle a (shown in FIG. 1C) between a first plane passing through the center of the ball 5 and of the magnetic field detection element 2 and a second plane passing through the magneto-resistive face, is in a range of 42–80 degrees. An angle θ between the center of the permanent magnet 1 and the center of the magnetic field detection element 2 with respect to the center of the ball 5 is in a range of 42–80 degrees.

In the embodiment, an angle between a plane which includes the magneto-resistive face and the ball 5 is set to $\tan^{-1}R/4$. In FIG. 1B, the magneto-resistive face may be formed on one of an upper face A, a rear face B, a underside face C, a front face D and another face parallel to these faces A–D. The magneto-resistive material for the magnetic field detection element is, for example, one of permalloy (Ni—Fe), Ni—Co, and Ni—Fe—Co alloy. In order to transform the detection output into a digital voltage, the pulse waveform shaping circuit in FIG. 4B is employed and the resistance value of the resistor 11 constituting the bridge circuit is set to be low, as disclosed in Japanese Patent Application, Second Publication, No. Hei 7-078528. In this configuration, the magnetic field detection element 2 positioned in a range of the angle α of 42–80 degrees, outputs a voltage signal at a high level in response to the travel of the ferromagnetic-ball 5.

Figure 5A:
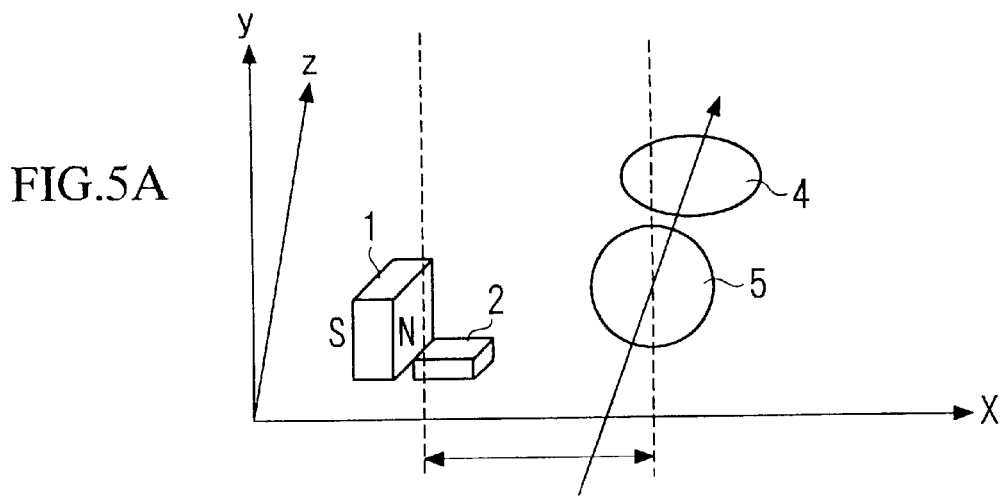
FIG. 5A is a view explaining the embodiment.
Figure 5B:
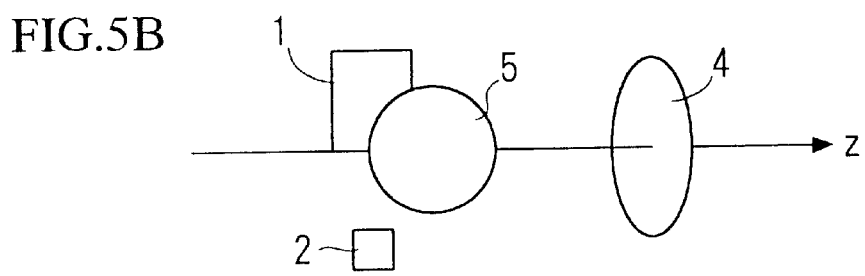
FIG. 5B is a side view explaining the embodiment.
Figure 5C:
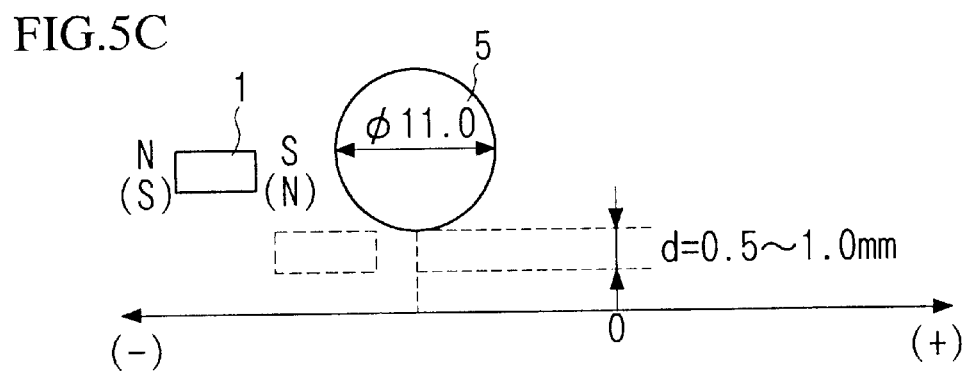
FIG. 5C is a plan view explaining the valid magnetic field area of the embodiment.

FIG. 5A is a view explaining a positional relationship of the permanent magnet 1, the magnetic field detection element 2 and the ferromagnetic-ball 5, and FIG. 5B is a side view explaining the embodiment. FIG. 5C shows an example of the position of the magnetic field detection element.

Figure 5D:
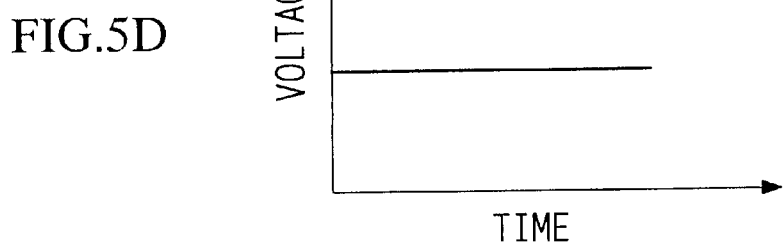
FIG. 5D is a wave-form chart of the output from the ferromagnetic-article sensor of the embodiment wherein the upper graph shows the passing of a ferromagnetic-article; the bottom graph shows the state when no ferromagnetic-article is passing.

The ferromagnetic-ball 5 has a radius of 11 millimeters. The permanent magnet 1 has a surface magnetic flux density of 1000–2000 gauss. The magnetic field detecting element is MRSM76 or MRSS95 (made by Nippon Electric Campany) responsive to a surface magnetic field in a gap of 0.5–1.0 millimeter, and is positioned in an rectangular area specified in FIG. 5C. Namely, the magnetic field detection element 2 is disposed at the position of −4x=4 millimeters on horizontal axis (also shown in FIG. 3A). As a result, the ferromagnetic-article sensor which outputs the voltage signal of "1" (high) in response to the travel of the ferromagnetic-ball 5 as shown in FIG. 5D, is constructed.

Figure 6:
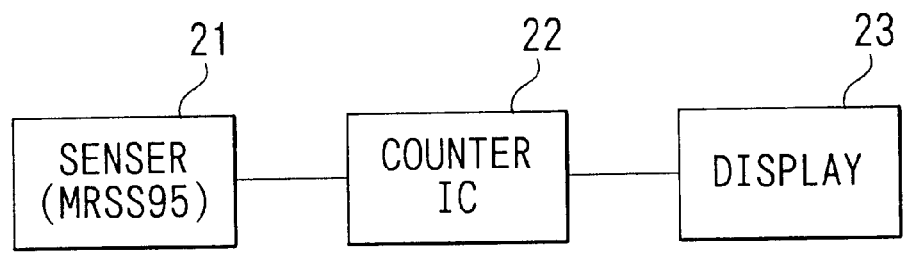
FIG. 6 is a schematic diagram of a display circuit connected to the ferromagnetic-article sensor of the embodiment.
Figure 7:
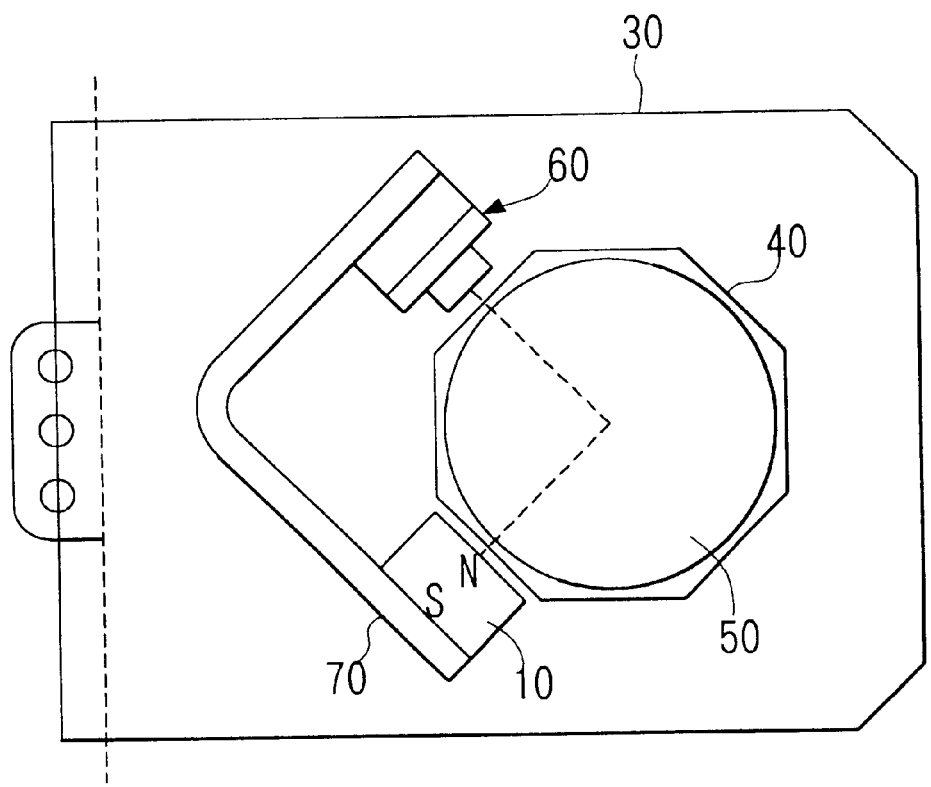
FIG. 7 is a plan view showing a metal ball detecting apparatus of the prior art.

FIG. 6 is a block diagram showing a display circuit for counting the travel of the ferromagnetic-ball 5. A counter integrated circuit 22 counts the pulse voltage outputted from the ferromagnetic-article sensor 21, and a total value counted by the counter 22 is displayed by a display 23.

Although the ferromagnetic-article is the ball 5 in the description of the embodiment, the shape of the ferromagnetic-article is not limited as long as the magnetic field in a specified direction as previously described is formed by the permanent magnet and the ferromagnetic-article.

The above embodiment is described when the value on the x-axis is negative. When the value on the x-axis is positive, similar characteristics can be obtained, and the ferromagnetic-article sensor can be constructed by disposing the magnetic field detection element to the right of the center of the article. That is, when a permanent magnet having sufficiently great surface flux magnetic density is employed, the magnetic field strength is increased from 0x toward the right on the x-axis, in a manner similar to that from 0x toward the left on the x-axis.

Accordingly, the permanent magnet should be disposed at the same position, while the magnetic field detection element should be disposed on the right side of the center of the ferromagnetic-article. In FIG. 1C, the angle a between a first plane passing through the centers of the ferromagnetic-ball 5 and of the magnetic field detection element 2 and a second plane passing through the magneto-resistive face, should be in a range of one of 42–80 degrees, 132–170 degrees, 222–260 degrees, and 312–350 degrees. An angle θ between the center of the permanent magnet 1 and the center of the magnetic field detection element 2 with respect to the center of the ball 5 should be in a range of one of 42–80 degrees, 132–170 degrees, 222–260 degrees, and 312–350 degrees.

Although the parallel magnetic field detection element having an AMR (anisotropic magneto-resistive) effect is employed in the embodiment, a GMR (giant magneto-resistive) element, or a CMR (colossal magneto-resistive) element can be used.

Further, pluralities of the permanent magnet and the magnetic field detection element may be provided along the moving direction of the ferromagnetic-article, so as to detect a rate of travel of the ferromagnetic-article traveling through the pathway by measuring the interval of the travels of ferromagnetic-articles. Furthermore, an electromagnet may be used instead of the permanent magnet. The pathway for the ferromagnetic-article is not limited to the circular through-hole.

This invention may be embodied in other forms or carried out in other ways without departing from the spirit thereof. The present embodiment is therefore to be considered in all respects illustrative and not restrictive, the scope of the invention being indicated by the appended claims, and all modifications falling within the meaning and range of equivalency are intended to be embraced therein.

What is claimed is:

1. A ferromagnetic-ball sensor, comprising:

a base having a pathway for a ferromagnetic-ball;

a magnet mounted on the base for forming a magnetic field between the magnet and ferromagnetic-ball passing through the pathway; and a magnetic field detection element for detecting a part of the magnetic field formed by the magnet, wherein the magnetic field detection element has a magneto-resistive face responsive to a magnetic field parallel to the magneto-resistive face;

whereby the base, the magnet, and the magnetic field detection element are arranged such that the magnetic field detection element detects a modification of a part of the magnetic field when the ferromagnetic ball travels through the pathway;

an angle between the center of the magnet and the center of the magnetic field detection element with respect to the center of the ferromagnetic ball passing through the pathway is in a range of one of 42–80 degrees, 132–170 degrees, 222–260 degrees, and 312–350 degrees; and an angle between the magneto-resistive face and a plane passing through the centers of the ferromagnetic ball and of the magnetic field detection element is in a range of one of 42–80 degrees, 132–170 degrees, 222–260 degrees, and 312–350 degrees.

2. The ferromagnetic-ball sensor according to claim 1, wherein pluralities of said magnet and said magnetic field detection element are provided so as to detect a rate of travel of said ferromagnetic-article traveling through said pathway.

3. The ferromagnetic-ball sensor according to claim 1, wherein said magnetic field detection element is formed of a thin film of at least one of Ni—Fe, Ni—Co, and Ni—Fe—Co.

4. The ferromagnetic-ball sensor according to claim 1, wherein said magnetic field detection element is arranged on a silicon substrate of an integrated circuit chip and is connected to a circuit in said integrated circuit chip.

5. The ferromagnetic-ball sensor according to claim 1, wherein said magnetic field detection element is at least one of an anisotropic magneto-resistive element, a giant magneto-resistive element, and a colossal magneto-resistive element.

6. The ferromagnetic-ball sensor according to claim 1, wherein said pathway-forming means comprises a base having a hole defining the pathway for allowing the movement of said ferromagnetic ball, said magnet being mounted on said base.

7. The ferromagnetic-ball sensor according to claim 1, wherein said magnet is a permanent magnet.

8. The ferromagnetic ball sensor according to claim 1, wherein the magnetic field direction element and the magnet are not connected by a ferromagnetic material.

* * * * *

UNITED STATES PATENT AND TRADEMARK OFFICE
CERTIFICATE OF CORRECTION

PATENT NO. : 6,198,276 B1  
DATED : March 6, 2001  
INVENTOR(S) : H. Konno

Page 1 of 1

It is certified that error appears in the above-identified patent and that said Letters Patent is hereby corrected as shown below:

Column 7, claim 2,
Line 12, "magnetic-article" should read -- magnetic-ball --

Signed and Sealed this

Eighth Day of January, 2002

*Attest:*

*Attesting Officer*

JAMES E. ROGAN
*Director of the United States Patent and Trademark Office*